US012573940B2

(12) United States Patent
Masuhara

(10) Patent No.: US 12,573,940 B2
(45) Date of Patent: Mar. 10, 2026

(54) DRIVE DEVICE AND SHORT CIRCUIT DETECTION FOR A TRANSISTOR ACCOUNTING FOR THE MILLER EFFECT

(71) Applicant: Mitsubishi Electric Corporation, Tokyo (JP)

(72) Inventor: Takashi Masuhara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 268 days.

(21) Appl. No.: 18/024,776

(22) PCT Filed: Oct. 28, 2020

(86) PCT No.: PCT/JP2020/040492
§ 371 (c)(1),
(2) Date: Mar. 6, 2023

(87) PCT Pub. No.: WO2022/091264
PCT Pub. Date: May 5, 2022

(65) Prior Publication Data
US 2023/0308086 A1 Sep. 28, 2023

(51) Int. Cl.
*H02M 1/08* (2006.01)
*H02H 3/08* (2006.01)

(52) U.S. Cl.
CPC ............... *H02M 1/08* (2013.01); *H02H 3/08* (2013.01)

(58) Field of Classification Search
CPC ............................................ H02M 1/08–088
See application file for complete search history.

(56) References Cited

U.S. PATENT DOCUMENTS

2016/0013788 A1* 1/2016 Thalheim ........... H03K 17/0828
327/109
2016/0094145 A1* 3/2016 Oh .................... H02M 3/33523
363/89
(Continued)

FOREIGN PATENT DOCUMENTS

JP      2012-222498 A      11/2012
JP      2014-117112 A       6/2014
(Continued)

OTHER PUBLICATIONS

International Search Report and Written Opinion mailed on Nov. 24, 2020, received for PCT Application PCT/JP2020/040492, filed on Oct. 28, 2020, 9 pages including English Translation.
(Continued)

*Primary Examiner* — Peter M Novak
(74) *Attorney, Agent, or Firm* — XSENSUS LLP

(57) ABSTRACT

A drive circuit drives a power semiconductor element including a gate electrode, a first main electrode and a second main electrode. The drive circuit includes: a controller to control an opened/closed state of the power semiconductor element based on an externally received command; a short circuit determination circuitry to determine whether the power semiconductor element is in a short-circuited state in a turn-on operation of the power semiconductor element, and output a determination signal indicating a determination result; and a filter to receive the determination signal from the short circuit determination circuitry, generate a delay signal of the determination signal, and output the delay signal to the controller. A delay time of the filter is set to be longer than a length of a Miller period in the turn-on operation of the power semiconductor element.

20 Claims, 13 Drawing Sheets

(56)             References Cited

U.S. PATENT DOCUMENTS

| 2020/0127657 A1 | 4/2020 | Masuhara et al. |
| 2020/0212906 A1 | 7/2020 | Mukunoki et al. |

FOREIGN PATENT DOCUMENTS

| JP | 2017-143700 A | 8/2017 |
| WO | 2018/229856 A1 | 12/2018 |
| WO | 2019/021590 A1 | 1/2019 |

OTHER PUBLICATIONS

Office Action issued Dec. 31, 2023 in Indian Patent Application No. 202327011795, 6 pages.
Office Action issued Jan. 5, 2026 in Indian Patent Application No. 202327011795, 2 pages.

\* cited by examiner

Figure 9:
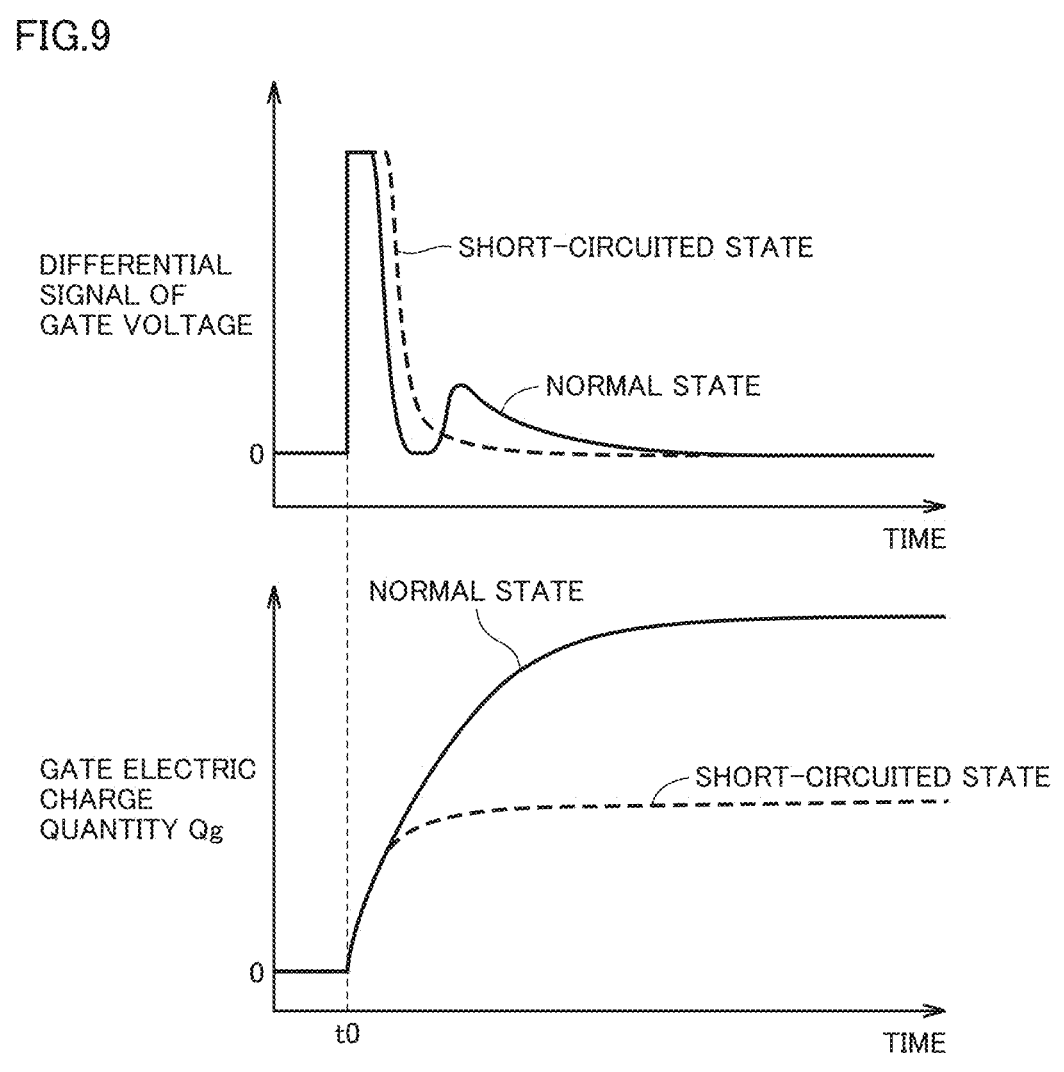

DIFFERENTIAL
SIGNAL OF
GATE VOLTAGE

SHORT-CIRCUITED STATE

NORMAL STATE

0

TIME

NORMAL STATE

GATE ELECTRIC
CHARGE
QUANTITY Qg

SHORT-CIRCUITED STATE

0 t0          TIME

DRIVE DEVICE AND SHORT CIRCUIT DETECTION FOR A TRANSISTOR ACCOUNTING FOR THE MILLER EFFECT

CROSS-REFERENCE TO RELATED APPLICATION

The present application is a National Stage Application of International Patent Application No. PCT/JP2020/040492, filed on Oct. 28, 2020. The International Patent Application published as WO 2022/091264 A1 on May 5, 2022, the entire contents of which are incorporated herein by reference.

TECHNICAL FIELD

The present disclosure relates to a drive circuit for a power semiconductor element, a semiconductor device, and a power conversion device.

BACKGROUND ART

When a short-circuited state occurs in a power semiconductor element such as an IGBT (Insulated Gate Bipolar Transistor) or a MOSFET (Metal Oxide Semiconductor Field Effect Transistor), a high current may flow and the semiconductor element may be thermally destructed. Therefore, the function of sensing the short-circuited state of the power semiconductor element and protecting the power semiconductor element is required.

In addition, in recent years, short circuit tolerance has decreased with a reduction in size of power semiconductor elements, and thus, high-speed protection from a short circuit has been increasingly required. A short circuit protection circuit that achieves high-speed protection from a short circuit may malfunction due to its high responsiveness, and thus, measures are taken against noise by using a filter or the like.

Japanese Patent Laying-Open No. 2017-143700 (PTL 1) describes a short circuit detection device configured to detect a short-circuited state of a power semiconductor element by using the fact that a Miller period of a gate voltage disappears at the time of a short circuit. The short circuit detection device detects that the power semiconductor element is short-circuited, when the gate voltage reaches a reference voltage earlier than a predetermined time. The short circuit detection device further determines that the power semiconductor element is not short-circuited, when a decrease in gate voltage is detected within a predetermined time period, even if the short circuit detection device detects the short-circuited state. That is, in PTL 1, when the gate voltage temporarily exceeds the reference voltage due to noise and the like, the short circuit detection device determines that the power semiconductor element is not short-circuited, which leads to suppression of false detection of a short circuit.

Japanese Patent Laying-Open No. 2014-117112 (PTL 2) describes a short circuit sensing circuit configured to sense a short circuit current flowing through a power semiconductor element, based on a voltage across terminals of a resistor connected to a sense cell of the power semiconductor element. In PTL 2, a noise filtering element is connected to an output of the short circuit sensing circuit, to thereby remove a harmonic wave caused by switching noise from the output of the short circuit sensing circuit, and as a result, suppress false sensing of a short circuit. PTL 2 further describes a configuration in which a noise filtering element is connected to an output of a short circuit sensing circuit configured to sense a short circuit using a positive electrode-side voltage (e.g., a collector voltage in the case of an IGBT) of a power semiconductor element.

CITATION LIST

Patent Literature

PTL 1: Japanese Patent Laying-Open No. 2017-143700
PTL2: Japanese Patent Laying-Open No. 2014-117112

SUMMARY OF INVENTION

Technical Problem

However, the short circuit detection device described in PTL 1 determines that the power semiconductor element is not short-circuited, when a decrease in gate voltage is detected within the predetermined time period. Therefore, when a physical quantity (such as, for example, a gate current and a gate electric charge) other than the gate voltage is used for short circuit determination, or when short circuit determination is made based on a correlation among a plurality of physical quantities obtained from the gate electrode, the short circuit detection device described in PTL 1 is not applicable.

In the short circuit sensing circuit described in PTL 2, the short circuit current is sensed using the resistor connected to the sense cell of the power semiconductor element, and thus, the sense cell is required. Therefore, when the power semiconductor element without a sense cell is used, the short circuit sensing circuit described in PTL 2 is not applicable. In addition, when the power semiconductor element with a sense cell and the resistor is used, it is concerned that the power semiconductor element and a drive circuit increase in size. Even when a short circuit is sensed based on the positive electrode-side voltage of the power semiconductor element, a high voltage diode is required, and thus, it is concerned that the power semiconductor element and the drive circuit increase in size.

The present disclosure has been made to solve the above-described problems, and an object of the present disclosure is to suppress a malfunction caused by wrong determination in a drive circuit that is applicable to a wide variety of power semiconductor elements and capable of simply determining a short-circuited state of a power semiconductor element.

Solution to Problem

A drive circuit for a power semiconductor element according to the present disclosure is a drive circuit that drives a power semiconductor element including a gate electrode, a first main electrode and a second main electrode. The drive circuit includes: a controller to control an opened/closed state of the power semiconductor element based on an externally received command; a short circuit determination circuitry to determine whether the power semiconductor element is in a short-circuited state in a turn-on operation of the power semiconductor element, and output a determination signal indicating a determination result; and a filter to receive the determination signal from the short circuit determination circuitry, generate a delay signal of the determination signal, and output the delay signal to the controller. A delay time of the filter is set to be longer than a length of a Miller period in the turn-on operation of the power semiconductor element.

Advantageous Effects of Invention

According to the present disclosure, it is possible to suppress a malfunction caused by wrong determination in a drive circuit that is applicable to a wide variety of power semiconductor elements and capable of simply determining a short-circuited state of a power semiconductor element.

BRIEF DESCRIPTION OF DRAWINGS

FIG. 1 shows a first configuration example of a power semiconductor element and a drive circuit therefor according to a first embodiment.

FIG. 9 shows waveform diagrams schematically showing time variation in differential signal of the gate voltage and gate electric charge.

DESCRIPTION OF EMBODIMENTS

Figure 2:
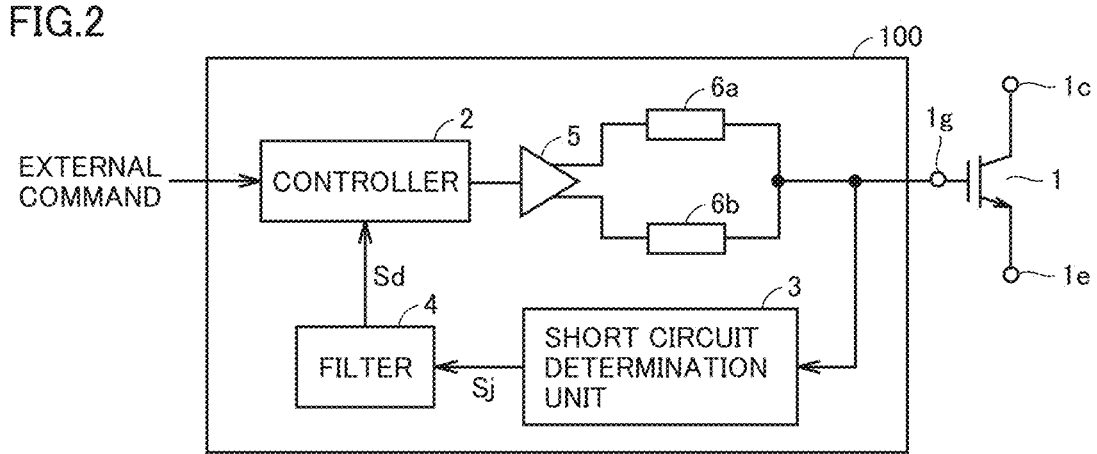
FIG. 2 shows a second configuration example of the power semiconductor element and the drive circuit therefor according to the first embodiment.

Embodiments of the present disclosure will be described in detail with reference to the drawings, in which the same or corresponding portions are denoted by the same reference characters and description thereof will not be repeated. The embodiments and modifications described below may be combined as appropriate.

First Embodiment

Figure 1:
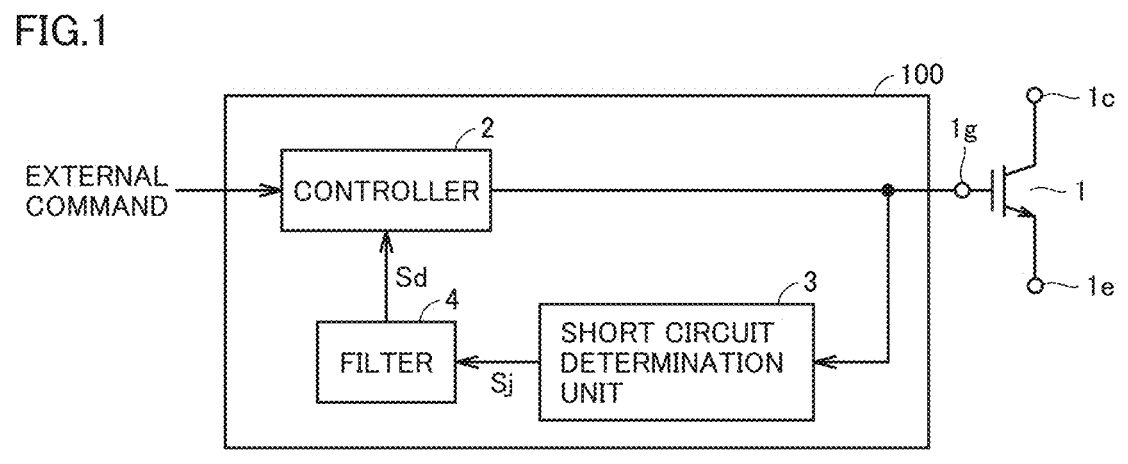

FIG. 1 shows a first configuration example of a semiconductor device including a drive circuit according to a first embodiment. As shown in FIG. 1, the semiconductor device according to the first configuration example includes a power semiconductor element 1 (hereinafter, simply referred to as "semiconductor element 1") and a drive circuit 100.

Semiconductor element 1 includes a first main electrode, a second main electrode and a gate electrode. A device made of any one of Si (silicon), SiC (silicon carbide), GaN (gallium nitride), and $Ga_2O_3$ (gallium oxide) can be applied as semiconductor element 1.

Although the example of FIG. 1 illustrates an IGBT as semiconductor element 1, semiconductor element 1 is not necessarily limited to an IGBT and may be a fully controllable power semiconductor element such as a MOSFET. Semiconductor element 1 is included in a power converter such as an inverter that converts DC power into AC power and a converter that converts AC power into DC power.

Semiconductor element 1 includes a collector electrode 1c, an emitter electrode 1e and a gate electrode 1g. A voltage higher than a voltage applied to emitter electrode 1e is applied to collector electrode 1c. Gate electrode 1g corresponds to "gate electrode", collector electrode 1c corresponds to "first main electrode", and emitter electrode 1e corresponds to "second main electrode".

Drive circuit 100 is connected to gate electrode 1g of semiconductor element 1 and drives semiconductor element 1. Drive circuit 100 includes a controller 2, a short circuit determination unit 3 and a filter 4.

Controller 2 receives an external command and controls an opened/closed state of semiconductor element 1. Specifically, when an on-command is input externally, controller 2 applies, to gate electrode 1g of semiconductor element 1, a gate voltage Vg for bringing semiconductor element 1 into the closed state (on state) (hereinafter, referred to as "turn-on") (hereinafter, referred to as "on gate voltage Vg_on"). As a result, semiconductor element 1 is turned on and is in the closed state.

When an off-command is input externally, controller 2 applies, to gate electrode 1g of semiconductor element 1, gate voltage Vg for bringing semiconductor element 1 into the opened state (off state) (hereinafter, referred to as "turn-off") (hereinafter, referred to as "off gate voltage Vg_off"). As a result, semiconductor element 1 is turned off and is in the opened state.

Short circuit determination unit 3 is connected to gate electrode 1g of semiconductor element 1 and determines whether semiconductor element 1 is in a short-circuited state, based on a physical quantity detected at gate electrode 1g. "Short-circuited state" herein refers to a state in which semiconductor element 1 is connected to a voltage source at a low resistance and an excessive short circuit current flows due to the factors such as failure or malfunction of a peripheral component of semiconductor element 1.

The physical quantity obtained from gate electrode 1g includes gate voltage Vg between gate electrode 1g and emitter electrode 1e, and a gate current Ig that flows into gate electrode 1g. Short circuit determination unit 3 determines the short-circuited state of semiconductor element 1 by making the use of the fact that there is a difference in waveform of the physical quantity in the turn-on operation between the normal state and the short-circuited state.

Specifically, in the normal state, "Miller period", which is a time period during which gate voltage Vg is constant, appears in the waveform of gate voltage Vg in the turn-on operation, before gate voltage Vg reaches on gate voltage Vg_on. In contrast, in the short-circuited state, the Miller period does not appear in the waveform of gate voltage Vg and gate voltage Vg rises to on gate voltage Vg_on all at once.

Short circuit determination unit 3 is configured to determine the short-circuited state of semiconductor element 1 by making the use of the fact that in the short-circuited state, the Miller period disappears in gate voltage Vg in the turn-on operation. Short circuit determination unit 3 outputs a determination signal Sj indicating a determination result. Specifically, short circuit determination unit 3 outputs determination signal Sj having a "L (logic low)" level when semiconductor element 1 is normal, and outputs determination signal Sj having a "H (logic high)" level when semiconductor element 1 is in the short-circuited state. That is, when it is determined that semiconductor element 1 is in the short-circuited state, short circuit determination unit 3 outputs determination signal Sj having the H level. A specific configuration of short circuit determination unit 3 will be described below.

Filter 4 generates a delay signal Sd obtained by delaying determination signal Sj output from short circuit determination unit 3, and outputs generated delay signal Sd to controller 2. Filter 4 has a delay time longer than a Miller period T_miller of semiconductor element 1. A specific configuration of filter 4 will be described below.

When noise is applied to gate electrode 1*g* during the Miller period in the turn-on operation of semiconductor element 1, or when a turn-off operation is started during the Miller period, the physical quantity of gate electrode 1*g* may change abruptly. The abrupt change in physical quantity during the Miller period may cause short circuit determination unit 3 to wrongly determine that semiconductor element 1 is in the short-circuited state. Thus, in drive circuit 100 according to the first embodiment, the delay time of filter 4 is set to be longer than the Miller period, which makes it possible for filter 4 to attenuate or cut off wrong determination signal Sj output from short circuit determination unit 3.

FIG. 2 shows a second configuration example of the semiconductor device including the drive circuit according to the first embodiment. The semiconductor device according to the second configuration example is different in configuration of drive circuit 100 from the semiconductor device according to the first configuration example. Drive circuit 100 according to the second configuration example is different from drive circuit 100 shown in FIG. 1 in that a buffer circuit 5, an on gate resistor 6*a* and an off gate resistor 6*b* are added. Since the remaining configuration of drive circuit 100 is the same as that of drive circuit 100 according to the first configuration example, detailed description will not be repeated here.

Buffer circuit 5 applies on gate voltage Vg_on input from controller 2 to gate electrode 1*g* of semiconductor element 1 through on gate resistor 6*a*. Buffer circuit 5 applies off gate voltage Vg_off input from controller 2 to gate electrode 1*g* of semiconductor element 1 through off gate resistor 6*b*.

Next, an operation of filter 4 in drive circuit 100 according to the first embodiment will be described with reference to FIGS. 3 to 5.

Figure 3:
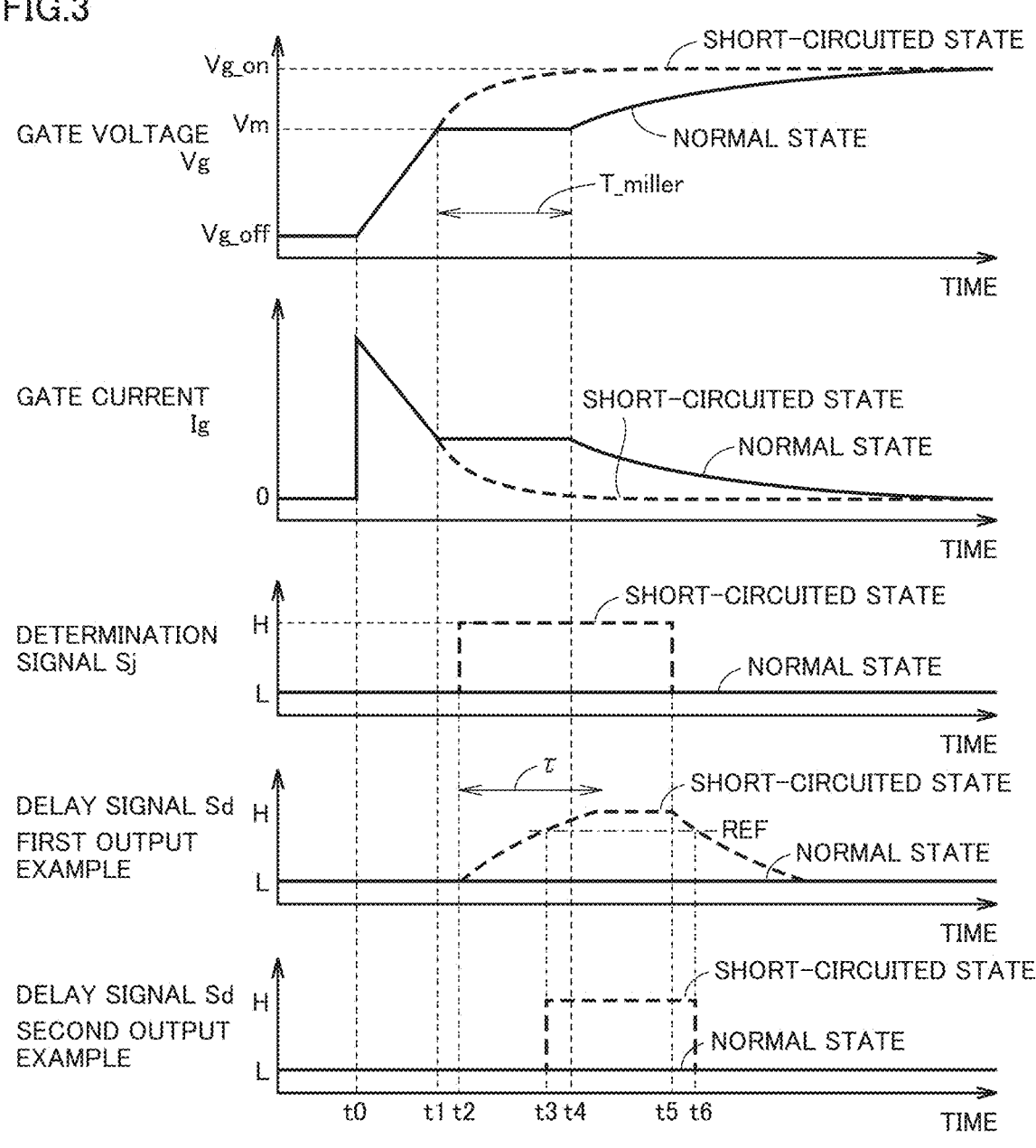
FIG. 3 shows waveform diagrams schematically showing time variation in gate voltage, gate current, determination signal, and delay signal in a turn-on operation of the power semiconductor element.

FIG. 3 shows waveform diagrams schematically showing time variation in gate voltage Vg and gate current Ig in the turn-on operation of semiconductor element 1. In FIG. 3, the waveforms of gate voltage Vg and gate current Ig in the normal state are indicated by solid lines, and the waveforms of gate voltage Vg and gate current Ig in the short-circuited state are indicated by broken lines.

First, gate voltage Vg and gate current Ig in the turn-on operation in the normal state will be described.

As shown in FIG. 3, when a command input to controller 2 changes from the off-command to the on-command at time t0, controller 2 applies on gate voltage Vg_on to gate electrode 1*g* of semiconductor element 1. As a result, gate voltage Vg of semiconductor element 1 starts to shift from off gate voltage Vg_off to on gate voltage Vg_on.

Specifically, after time t0, gate current Ig flows from controller 2 into gate electrode 1*g*, and a parasitic capacitance component between gate electrode 1*g* and emitter electrode 1*e* (hereinafter, referred to as "gate-to-emitter capacitance Cge") is thereby charged. Therefore, gate voltage Vg rises gradually. A time period from time t0 to time t1 corresponds to a charging time period of gate-to-emitter capacitance Cge.

Next, when gate voltage Vg exceeds a threshold voltage at time t1, semiconductor element 1 starts to be turned on. When semiconductor element 1 turns on, a collector current starts to flow between collector electrode 1*c* and emitter electrode 1*e*, and thus, a potential of collector electrode 1*c* starts to decrease. As a result, an electric charge stored in a parasitic capacitance component between gate electrode 1*g* and collector electrode 1*c* (hereinafter, referred to as "gate-to-collector capacitance Cgc") is discharged. During a time period from time t1 to time t4, most of gate current Ig flows through gate-to-collector capacitance Cgc and does not flow through gate-to-emitter capacitance Cge, and thus, gate voltage Vg does not rise and is maintained constant.

The time period during which gate voltage Vg is constant, like the time period from time t1 to time t4, is referred to as "Miller period". In addition, this constant voltage value (corresponding to Vm in the figure) is referred to as "Miller voltage". The Miller period is a time period for discharging the electric charge stored in gate-to-collector capacitance Cgc. Gate-to-collector capacitance Cgc corresponds to a feedback capacitance in semiconductor element 1. The length of the Miller period T_miller and the magnitude of Miller voltage Vm vary depending on operating conditions such as a voltage Vce between collector electrode 1*c* and emitter electrode 1*e* of semiconductor element 1, and the collector current.

When the discharging of gate-to-collector capacitance Cgc ends, gate voltage Vg rises again while gate-to-emitter capacitance Cge is charged, and then, gate voltage Vg reaches on gate voltage Vg_on. At this time, gate-to-collector capacitance Cgc (feedback capacitance) is in a state of being charged in a direction opposite to that before the turn-on operation. When the shift of semiconductor element 1 to the on state is completed, gate current Ig becomes zero.

Next, gate voltage Vg and gate current Ig in the turn-on operation in the short-circuited state will be described.

At time t0, in response to the externally input on-command, controller 2 applies on gate voltage Vg_on to gate electrode 1*g* of semiconductor element 1. As a result, gate voltage Vg of semiconductor element 1 starts to shift from off gate voltage Vg_off to on gate voltage Vg_on. At this time, gate current Ig flows from controller 2 into gate electrode 1*g* of semiconductor element 1.

When semiconductor element 1 is in the short-circuited state, a peripheral circuit connected to collector electrode 1*c* of semiconductor element 1 is short-circuited, and thus, a high voltage is applied between collector electrode 1*c* and emitter electrode 1*e*. Thus, the potential of collector electrode 1*c* of semiconductor element 1 becomes higher than a potential of gate electrode 1*g* and gate-to-collector capacitance Cgc (feedback capacitance) is not charged. Therefore, the Miller period does not appear in gate voltage Vg. As a result, gate voltage Vg rises to on gate voltage Vg_on all at once. Since gate current Ig for charging the feedback capacitance does not flow, either, gate current Ig rises immediately after time t0, and then, converges to zero earlier than the normal state.

The length of the Miller period T_miller can be given by T_miller=Qgc/Ig, assuming that Qgc represents an electric charge quantity stored in gate-to-collector capacitance Cgc and gate current Ig during the Miller period is constant.

When controller 2 uses on gate resistor 6a to control on gate voltage Vg_on applied to gate electrode 1g as in the second configuration example (see FIG. 2), gate current Ig can be calculated using Ig=(Vg_on−Vm)/Rg_on, where Rg_on represents a resistance value of on gate resistor 6a. According to this, T_miller can be expressed like the following equation (1):

$$T\_miller = \frac{Qgc \times Rg\_on}{Vg\_on - Vm}. \quad (1)$$

Gate-to-collector capacitance Cgc (feedback capacitance) has a dependence on the voltage between gate electrode 1g and collector electrode 1c. Therefore, when this is represented as Cgc(V), electric charge quantity Qgc can be given by the following equation (2):

$$Qgc = \int_{Vm}^{Vgc} Cgc(V)dv. \quad (2)$$

Finally, determination signal Sj and delay signal Sd will be described.

FIG. 3 further shows waveforms of determination signal Sj and delay signal Sd obtained by delaying determination signal Sj. The solid lines indicate the waveforms of determination signal Sj and delay signal Sd in the normal state, and the broken lines indicate the waveforms of determination signal Sj and delay signal Sd in the short-circuited state. Depending on an internal configuration of filter 4, delay signal Sd may have the waveform shown in a first or second output example.

As shown in FIG. 3, when short circuit determination unit 3 detects disappearance of the Miller period in gate voltage Vg at time t2 during the turn-on operation, short circuit determination unit 3 outputs determination signal Sj having the H level. In the example of FIG. 3, short circuit determination unit 3 is configured to output determination signal Sj having the H level during a predetermined time period from time t2 at which disappearance of the Miller period is detected to time t5. However, short circuit determination unit 3 may be configured to output determination signal Sj fixed to the H level, after time t2 at which disappearance of the Miller period is detected.

In the first output example of filter 4, delay signal Sd rises slowly after time t2 at which determination signal Sj shifts from the L level to the H level. Furthermore, delay signal Sd falls slowly after time t5 at which determination signal Sj shifts to the L level. The rising time and the falling time of delay signal Sd are determined by the delay time of filter 4. A time period during which delay signal Sd has the H level is shorter than a time period during which determination signal Sj has the H level.

The second output example of filter 4 is obtained by shaping delay signal Sd according to the first output example. Specifically, in filter 4, delay signal Sd according to the first output example is input to a comparator, where delay signal Sd is compared with a predetermined reference value REF. The comparator is configured to output delay signal Sd having the H level when delay signal Sd according to the first output example is equal to or higher than reference value REF, and output delay signal Sd having the L level when delay signal Sd is lower than reference value REF.

As a result, in the second output example, delay signal Sd is a pulsed signal showing the H level during a certain time period, similarly to determination signal Sj. However, the timing at which delay signal Sd rises to the H level and the timing at which delay signal Sd falls to the L level are later than the timing at which determination signal Sj rises to the H level and the timing at which determination signal Sj falls to the L level, respectively.

Filter 4 outputs generated delay signal Sd to controller 2. Based on delay signal Sd having the H level, controller 2 detects that semiconductor element 1 is in the short-circuited state. When it is detected that semiconductor element 1 is in the short-circuited state, controller 2 generates off gate voltage Vg_off regardless of an externally received command and applies off gate voltage Vg_off to gate electrode 1g of semiconductor element 1. As a result, semiconductor element 1 is controlled to the off state at high speed, and thus, semiconductor element 1 can be protected at high speed.

According to short circuit determination unit 3 of the first embodiment, a sense cell of the semiconductor element is not required, and thus, short circuit determination unit 3 is also applicable to a semiconductor element that does not include a sense cell and a resistor, and can simply determine the short-circuited state of the semiconductor element. Furthermore, when semiconductor element 1 is short-circuited, the Miller period is not present during the turn-on operation, and thus, short circuit determination unit 3 can quickly determine the short-circuited state of semiconductor element 1 after the start of the turn-on operation. As described above, short circuit determination unit 3 is applicable to a wide variety of semiconductor elements and capable of simply detecting the short-circuited state of semiconductor element 1 at high speed.

During the turn-on operation, noise may be applied to gate electrode 1g of semiconductor element 1. Or, in response to controller 2 that receives the external off-command during the turn-on operation, the turn-off operation of semiconductor element 1 may be started. In either case, a physical quantity different from the physical quantity obtained in the normal state of semiconductor element 1 is obtained at gate electrode 1g. In such a case, short circuit determination unit 3 may determine that the Miller period in gate voltage Vg disappears, and wrongly output determination signal Sj having the H level.

Figure 4:
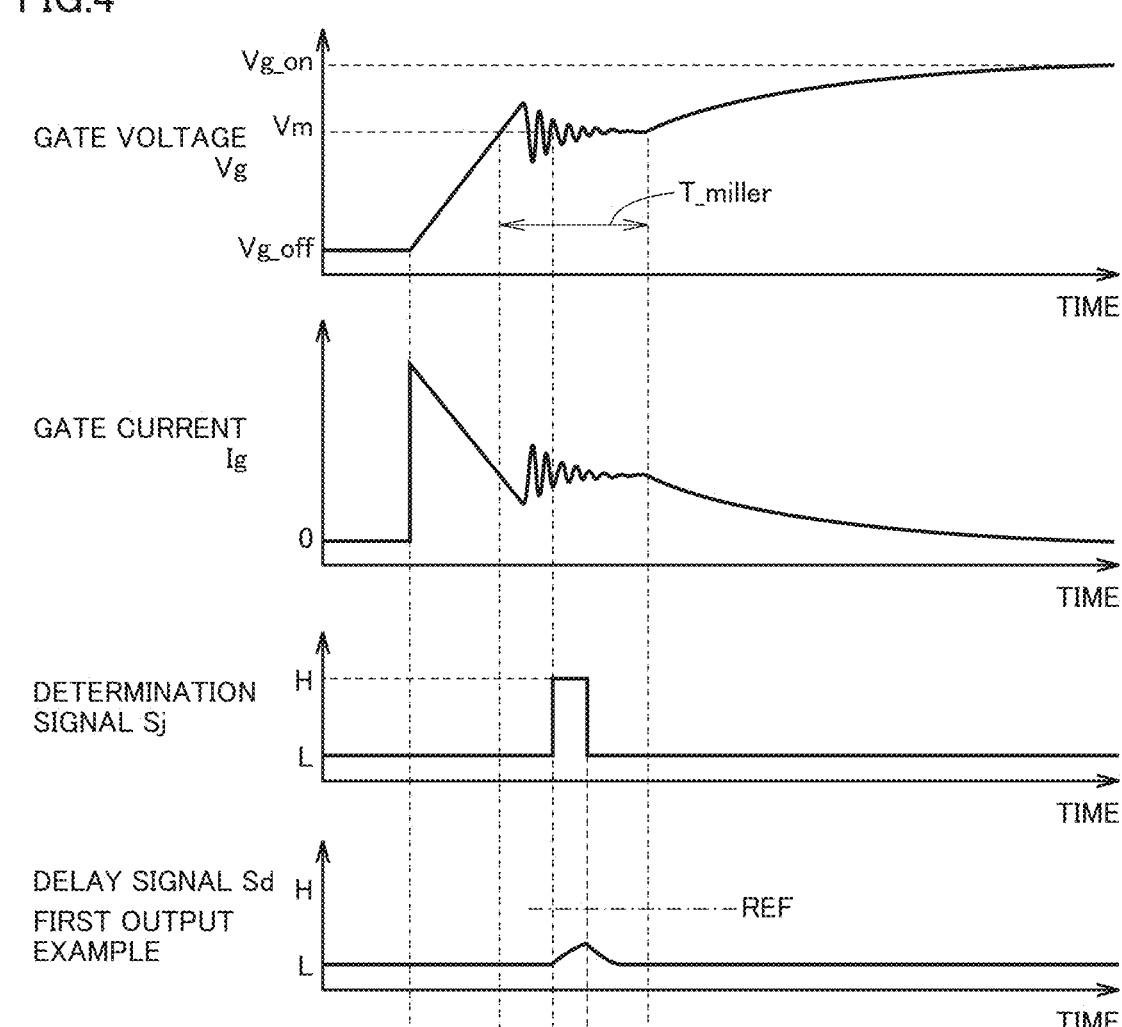
FIG. 4 shows waveform diagrams schematically showing time variation in gate voltage, gate current, determination signal, and delay signal when noise is applied to a gate electrode during the turn-on operation of the power semiconductor element.

FIG. 4 shows waveform diagrams schematically showing time variation in gate voltage Vg, gate current Ig, determination signal Sj, and delay signal Sd when noise is applied to gate electrode 1g during the turn-on operation of semiconductor element 1. In FIG. 4, a first output example of delay signal Sd corresponds to the same output signal of filter 4 as the first output example shown in FIG. 3. A second output example of delay signal Sd corresponds to the same output signal of filter 4 as the second output example shown in FIG. 3.

In the example of FIG. 4, it is assumed that the turn-on operation of semiconductor element 1 is started at time t0, and then, noise is applied to gate electrode 1g during the Miller period from time t1 to time t4.

In this case, oscillations occur in the waveform of each of gate voltage Vg and gate current Ig during the Miller period.

These oscillations are input to short circuit determination unit 3 as noise, which may cause short circuit determination unit 3 to malfunction.

In the example of FIG. 4, short circuit determination unit 3 detects the oscillations of gate voltage Vg and/or gate current Ig, determines that semiconductor element 1 is in the short-circuited state, and outputs determination signal Sj having the H level. Normally, determination signal Sj output from short circuit determination unit 3 in such a case is a short-pulse signal due to instantaneous false recognition that semiconductor element 1 is in the short-circuited state. A pulse width of determination signal Sj in this case is shorter than the length of the Miller period T_miller.

In the first output example of filter 4, filter 4 delays short-pulse determination signal Sj. As described above, filter 4 has a delay time longer than the Miller period. Therefore, the delay time of filter 4 is longer than the pulse width of determination signal Sj.

Delay signal Sd rises slowly after time t2 at which determination signal Sj shifts from the L level to the H level, and falls slowly after time t3 at which determination signal Sj shifts to the L level. However, since the pulse width of determination signal Sj is shorter than the delay time, delay signal Sd starts to attenuate before delay signal Sd reaches the H level. Therefore, no pulse is seen in delay signal Sd.

In the second output example of filter 4, delay signal Sd is generated based on comparison between delay signal Sd in the first output example and reference value REF. Since delay signal Sd in the first output example is lower than reference value REF, delay signal Sd in the second output example is also kept at the L level after time t2.

As described above, determination signal Sj wrongly output due to the noise applied during the Miller period is delayed or cut off by filter 4. Therefore, input of wrong determination signal Sj to controller 2 is blocked. Thus, it is possible to prevent such a malfunction that controller 2 controls semiconductor element 1 to the off state based on wrong determination signal Sj.

Figure 5:
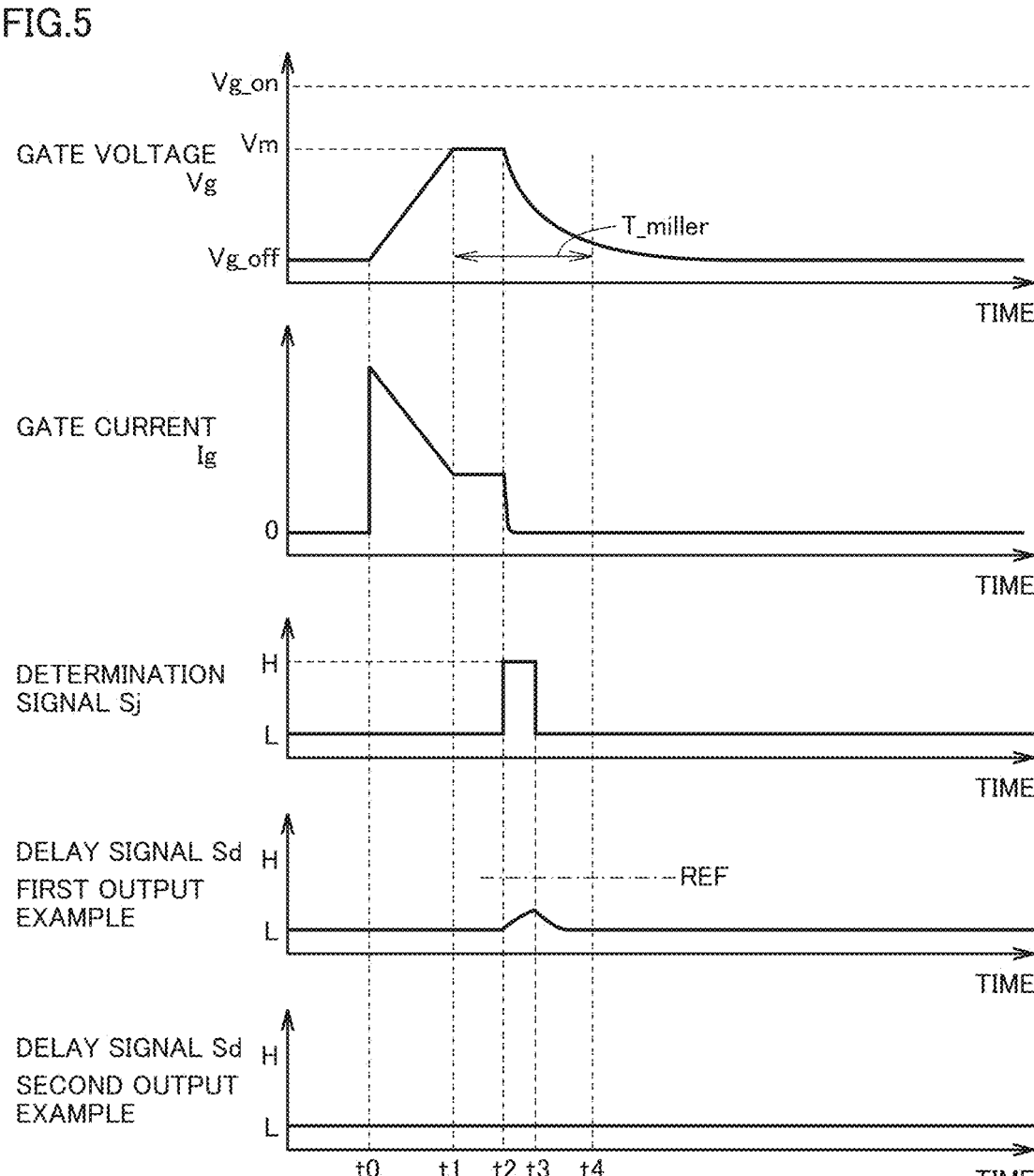
FIG. 5 shows waveform diagrams schematically showing time variation in gate voltage, gate current, determination signal, and delay signal when a turn-off operation is started during the turn-on operation of the power semiconductor element.

FIG. 5 shows waveform diagrams schematically showing time variation in gate voltage Vg, gate current Ig, determination signal Sj, and delay signal Sd when the turn-off operation is started during the turn-on operation of semiconductor element 1. In FIG. 5, a first output example of delay signal Sd corresponds to the same output signal of filter 4 as the first output example shown in FIG. 3. A second output example of delay signal Sd corresponds to the same output signal of filter 4 as the second output example shown in FIG. 3.

In the example of FIG. 5, it is assumed that the turn-on operation of semiconductor element 1 is started at time t0, and then, the turn-off operation is started at time t2 during the Miller period from time t1 to time t4.

In this case, gate voltage Vg decreases abruptly from Miller voltage Vm after time t2 and reaches off gate voltage Vg_off. Gate current Ig decreases abruptly after time t2 and converges to zero.

In the second configuration example (see FIG. 2) in which on gate resistor 6a and off gate resistor 6b are separated from each other, gate current Ig converges to zero. However, in the case where on gate resistor 6a and off gate resistor 6b are commonly used, gate current Ig flows in a direction opposite to that in the turn-on operation when the turn-off operation is started at time t2.

As described above, when the turn-off operation is started during the Miller period, gate voltage Vg and gate current Ig change abruptly, and thus, short circuit determination unit 3 determines that semiconductor element 1 is in the short-circuited state, and outputs determination signal Sj having the H level. In the example of FIG. 4, determination signal Sj is output at the moment of the start of the turn-off operation (time t2).

Determination signal Sj is caused by the abrupt change in physical quantity that occurs during the Miller period in which the short circuit determination is made. Therefore, even if the turn-off operation is started after the end of the short circuit determination, i.e., after the end of the Miller period, determination signal Sj is not output.

In addition, determination signal Sj output from short circuit determination unit 3 is a short-pulse signal due to instantaneous false recognition that semiconductor element 1 is in the short-circuited state. A pulse width of determination signal Sj in this case is shorter than the length of the Miller period T_miller.

In the first output example of filter 4, filter 4 delays short-pulse determination signal Sj. Delay signal Sd rises slowly after time t2 at which determination signal Sj shifts from the L level to the H level, and falls slowly after time t3 at which determination signal Sj shifts to the L level. However, since the pulse width of determination signal Sj is shorter than the delay time, delay signal Sd starts to attenuate before delay signal Sd reaches the H level. Therefore, no pulse is seen in delay signal Sd.

In the second output example of filter 4, delay signal Sd is generated based on comparison between delay signal Sd in the first output example and reference value REF. Since delay signal Sd in the first output example is lower than reference value REF, delay signal Sd in the second output example is also kept at the L level after time t2.

As described above, determination signal Sj wrongly output due to the turn-off operation during the Miller period is delayed or cut off by filter 4. Therefore, input of wrong determination signal Sj to controller 2 is blocked. Thus, it is possible to prevent such a malfunction that controller 2 controls semiconductor element 1 to the off state based on wrong determination signal Sj.

As described above, when noise is applied to gate electrode 1g during the Miller period in the turn-on operation (see FIG. 3), or when the turn-off operation is started during the Miller period (see FIG. 4), short circuit determination unit 3 may wrongly output determination signal Sj having the H level due to the abrupt change in physical quantity at gate electrode 1g. Normally, this wrong determination signal Sj is a short-pulse signal, and a length of a time period during which determination signal Sj has the H level is shorter than the length of the Miller period T_miller.

In drive circuit 100 according to the first embodiment, filter 4 is provided between short circuit determination unit 3 and controller 2, and the length of the delay time of filter 4 is set to be longer than the length of the Miller period T_miller. Therefore, determination signal Sj wrongly output by short circuit determination unit 3 can be delayed or cut off by filter 4. That is, when t represents the delay time of filter 4, the relationship given by the following equation (3) is satisfied between delay time s and the length of the Miller period T_miller given by the equation (1).

$$\tau > \frac{Qgc \times \text{Rg\_on}}{\text{Vg\_on} - Vm} \tag{3}$$

According to drive circuit 100 of the first embodiment, it is possible to suppress a malfunction caused by a wrong determination signal in a drive circuit configured to be applicable to a wide variety of semiconductor elements and capable of simply detecting a short-circuited state of semiconductor element 1 at high speed.

In the first embodiment, description has been given of the configuration example in which short circuit determination unit 3 outputs determination signal Sj having the L level when semiconductor element 1 is in the normal state, and outputs determination signal Sj having the H level when semiconductor element 1 is in the short-circuited state. However, short circuit determination unit 3 may be configured to output determination signal Sj having the H level when semiconductor element 1 is in the normal state, and output determination signal Sj having the L level when semiconductor element 1 is in the short-circuited state.

Second Embodiment

In a second embodiment, description will be given of a first configuration example of filter 4 applied to drive circuit 100 according to the first embodiment (see FIGS. 1 and 2).

Figure 6:
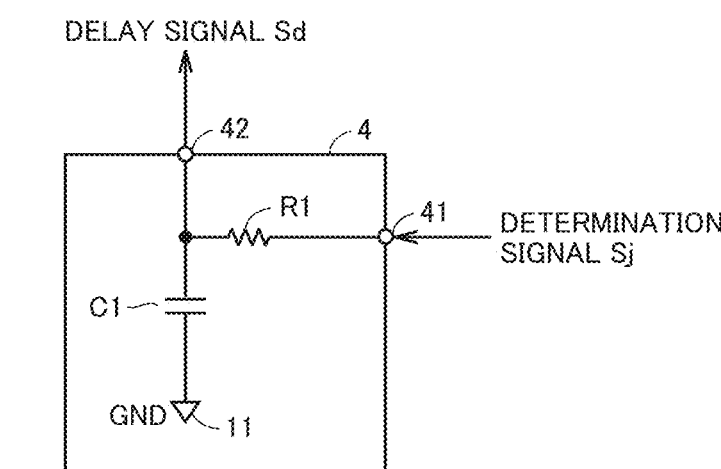
FIG. 6 shows a first configuration example of a filter.

FIG. 6 shows a first configuration example of filter 4. As shown in FIG. 6, filter 4 according to the first configuration example is an RC circuit including a resistor R1 and a capacitor C1. Resistor R1 and capacitor C1 are connected in series between an input terminal 41 and a ground 11. A connection point of resistor R1 and capacitor C1 is connected to an output terminal 42. Input terminal 41 receives determination signal Sj from short circuit determination unit 3. Output terminal 42 outputs delay signal Sd of determination signal Sj.

In the first configuration example, a delay signal A' output from output terminal 42 with respect to an input signal A received by input terminal 41 can be expressed like the following equation (4):

$$A' = A \times \exp\left(-\frac{t}{R1 \times C1}\right), \tag{4}$$

where R1 represents a resistance value of resistor R1, C1 represents a capacitance value of capacitor C1, and t represents a time period from the time when input signal A is received.

R1×C1 in the equation (4) corresponds to a time constant of the RC circuit. By using this time constant (R1×C1) as delay timer of filter 4 and setting the values of R1 and C1 to satisfy the relationship of the equation (3) above, the operation of filter 4 described in the first embodiment can be achieved. Filter 4 is not limited to the configuration shown in FIG. 6, and may be formed of a plurality of resistors and a plurality of capacitors.

According to the circuit configuration shown in FIG. 6, delay signal Sd shown in the first output example in FIGS. 4 and 5 can be generated. Furthermore, in the circuit configuration shown in FIG. 6, filter 4 can generate delay signal Sd shown in the second output example in FIGS. 4 and 5 by connecting a comparator between the connection point of resistor 1 and capacitor C1 and output terminal 42.

Third Embodiment

In a third embodiment, description will be given of a second configuration example of filter 4 applied to the drive circuit according to the first embodiment (see FIGS. 1 and 2).

Figure 7A:
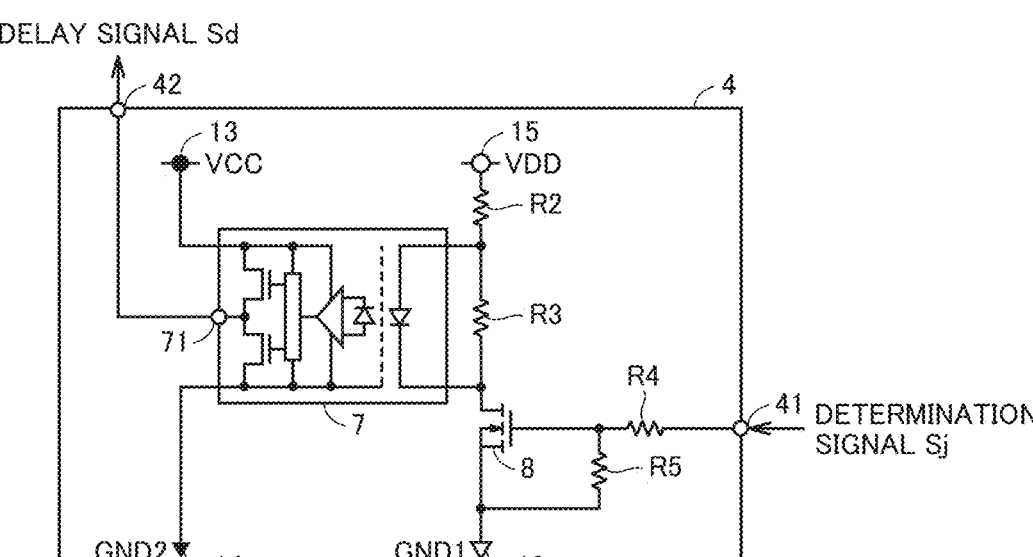
FIG. 7A shows a part of a second configuration example of the filter.
Figure 7B:
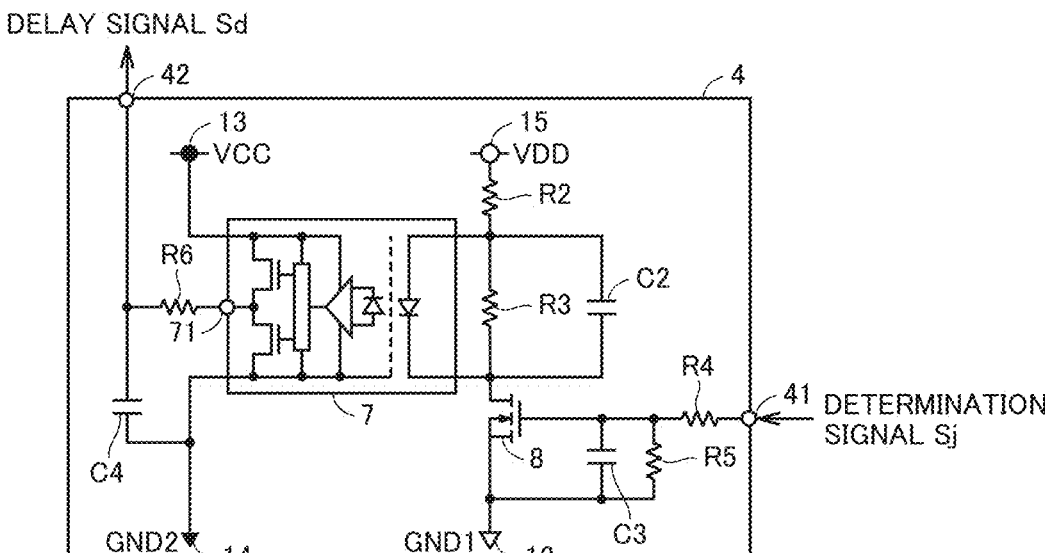
FIG. 7B shows the second configuration example of the filter.

FIGS. 7A and 7B are circuit diagrams showing the second configuration example of filter 4. Filter 4 according to the second configuration example includes at least one RC circuit and an optocoupler 7. FIG. 7A shows a configuration example of a circuit for driving optocoupler 7. FIG. 7B shows a configuration example of a circuit in which at least one RC circuit is added to the circuit shown in FIG. 7A.

In filter 4 according to the second configuration example, input terminal 41 that receives determination signal Sj is electrically insulated from output terminal 42 that outputs delay signal Sd. Therefore, filter 4 can transmit delay signal Sd of determination signal Sj to controller 2 while electrically insulating short circuit determination unit 3 from controller 2.

According to this, when short circuit determination unit 3 is connected to gate electrode 1g of semiconductor element 1 on the high side (on the high-voltage side) in a power converter, for example, it is possible to prevent controller 2 from receiving a high voltage and being destroyed, because short circuit determination unit 3 is electrically insulated from controller 2. Normally, when semiconductor element 1 on the high side is driven, controller 2 ensures electric insulation between the externally received input and the gate voltage by including an insulation circuit. Thus, instead of the present configuration example in which optocoupler 7 is provided in filter 4, controller 2 may be further provided with an insulation circuit for the determination signal and this insulation circuit may receive delay signal Sd from filter 4.

As shown in FIG. 7A, on the primary side of optocoupler 7, resistors R2 and R3 and a MOSFET 8 are connected in series in this order between a power supply node 15 that supplies a power supply potential VDD and a ground 12 having a ground potential GND1. A light emitting element (light emitting diode) of optocoupler 7 is connected between a first terminal and a second terminal of resistor R3. A resistor R4 and a resistor R5 are connected in series between input terminal 41 and ground 12. A connection point of resistor R4 and resistor R5 is connected to a gate of MOSFET 8.

On the secondary side of optocoupler 7, a light receiving element is connected between a power supply node 13 that supplies a power supply potential VCC and a ground 14 having a ground potential GND2. An output node 71 of the light receiving element is connected to output terminal 42.

When determination signal Sj having the H level is received at input terminal 41, MOSFET 8 is in the on state and a current flows through resistor R2 and resistor R3. When a voltage across the terminals of resistor R3 becomes equal to or higher than a reference voltage, optocoupler 7 operates and outputs power supply potential VCC of power supply node 13 to output node 71. In contrast, when determination signal Sj having the L level is received at input terminal 41, MOSFET 8 is in the off state, and thus, optocoupler 7 does not operate. In this case, optocoupler 7 outputs ground potential GND of ground 14 to output node 71. That is, optocoupler 7 outputs a signal having power supply potential VCC when determination signal Sj having the H level is received, and outputs a signal having ground potential GND2 when determination signal Sj having the L level is received.

In the circuit diagram shown in FIG. 7B, capacitors C2 and C3 are connected to the primary side of optocoupler 7, and a resistor R6 and a capacitor C4 are connected to the secondary side of optocoupler 7. Capacitor C2 is connected in parallel to resistor R3. Capacitor C3 is connected in parallel to resistor R5. Resistor R6 and capacitor C4 are connected in series between output node 71 and ground 14.

A connection point of resistor R6 and capacitor C4 is connected to output terminal 42.

Capacitor C2 is for delaying an input signal received by the primary side of optocoupler 7. A time constant in a delay of the input signal is C2/(1/R2+1/R3), where C2 represents a capacitance value of capacitor C2, R2 represents a resistance value of resistor R2, and R3 represents a resistance value of resistor R3.

Capacitor C3 is for delaying an input signal received by MOSFET 8. A time constant in a delay of the input signal is C3/(1/R4+1/R5), where C3 represents a capacitance value of capacitor C3, R4 represents a resistance value of resistor R4, and R5 represents a resistance value of resistor R5.

Resistor R6 and capacitor C4 are for delaying an output signal output from output node 71 of optocoupler 7 to output terminal 42. A time constant in a delay of the output signal is R6×C4, where C4 represents a capacitance value of capacitor C4 and R6 represents a resistance value of resistor R6.

In the circuit configuration in FIG. 7B, the delay time of filter 4 can be set using the above-described three types of time constants. A configuration for setting the delay time of filter 4 is not limited to the configuration shown in FIG. 7B, and the delay time of filter 4 may be set using at least one of the above-described three types of time constants. That is, the delay time of filter 4 can be set by adding at least one of capacitors C2 and C3 and/or a series circuit of resistor R6 and capacitor C4 to the circuit shown in FIG. 7A.

According to the circuit configuration in FIG. 7B, delay signal Sd shown in the first output example in FIG. 3 can be generated. Furthermore, in the circuit configuration in FIG. 7B, delay signal Sd shown in the second output example in FIG. 3 can be generated by connecting a comparator between the connection point of resistor 6 and capacitor C4 and output terminal 42.

In a configuration in which resistor 6 and capacitor C4 are removed from the circuit configuration in FIG. 7B, optocoupler 7 itself operates like a comparator, and thus, delay signal Sd shown in the second output example in FIG. 3 can be generated. However, a comparator may be further connected between output node 71 of optocoupler 7 and output terminal 42.

Fourth Embodiment

In a fourth embodiment, description will be given of a first configuration example of short circuit determination unit 3 applied to drive circuit 100 according to the first embodiment.

Figure 8:
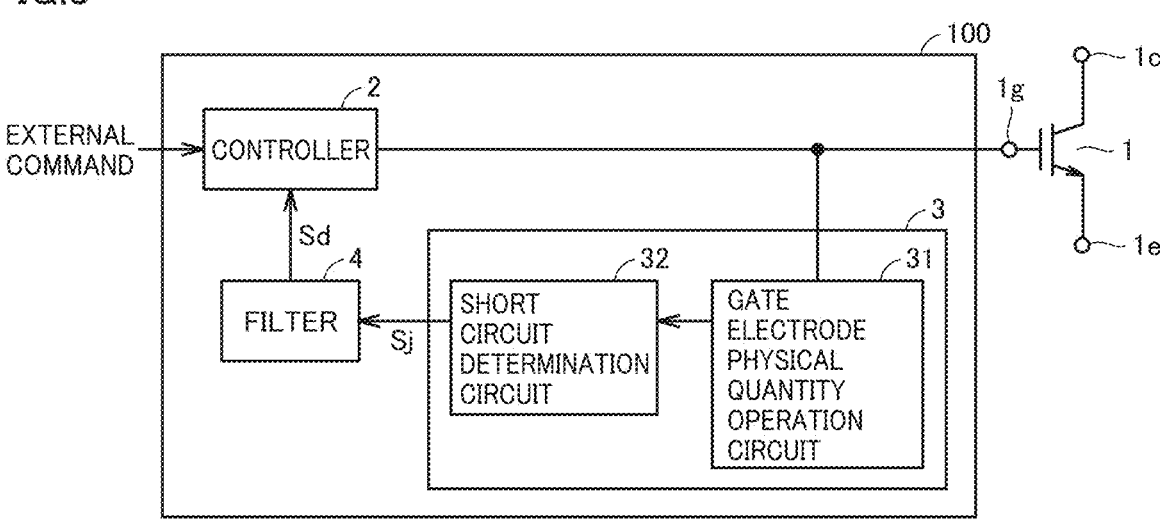
FIG. 8 shows a first configuration example of a short circuit determination unit.

FIG. 8 shows the first configuration example of short circuit determination unit 3 shown in FIG. 1.

As shown in FIG. 8, short circuit determination unit 3 according to the first configuration example includes a gate electrode physical quantity operation circuit 31 (hereinafter, simply referred to as "operation circuit 31") and a short circuit determination circuit 32.

Operation circuit 31 is connected to gate electrode 1g of semiconductor element 1 and obtains a physical quantity at gate electrode 1g. The physical quantity obtained by operation circuit 31 includes, for example, gate voltage Vg, gate current Ig, a differential signal of gate voltage Vg, and gate electric charge quantity Qg. The differential signal of gate voltage Vg can be obtained by time differentiation of gate voltage Vg. Gate electric charge quantity Qg can be obtained by time integration of gate current Ig. These physical quantities may be further subjected to delay processing, differentiation processing or integration processing.

Short circuit determination circuit 32 determines whether semiconductor element 1 is in the short-circuited state, based on the physical quantity obtained by operation circuit 31, and outputs determination signal Sj indicating a determination result to filter 4.

An example of the physical quantity detected by operation circuit 31 shown in FIG. 8 will be described with reference to FIG. 9.

FIG. 9 shows waveform diagrams schematically showing time variation in differential signal of gate voltage Vg and gate electric charge quantity Qg. In FIG. 9, the waveforms in the normal state are indicated by solid lines, and the waveforms in the short-circuited state are indicated by broken lines.

The Miller period is seen in gate voltage Vg in the normal state (see FIG. 3). Therefore, as shown in FIG. 9, the differential signal in the normal state is maintained at a constant value from time t0 at which the on-command is received to the start of the Miller period, and then, temporarily becomes zero during the Miller period. Thereafter, the differential signal rises again after the end of the Miller period, and then, converges to zero.

In contrast, gate voltage Vg in the short-circuited state increases monotonically and reaches on gate voltage Vg_on after time t0. Therefore, as shown in FIG. 9, the differential signal is kept at a constant value immediately after time t0, and then, decreases and converges to zero.

Gate current Ig in the normal state rises abruptly at time t0 at which the on-command is received, and then, starts to fall. Gate current Ig is maintained at a constant value during the Miller period, and then, falls again and converges to zero (see FIG. 3). Therefore, as shown in FIG. 9, gate electric charge quantity Qg in the normal state rises gradually and converges to a constant value after time t0.

In contrast, gate current Ig in the short-circuited state rises abruptly at time t0, and then, starts to fall and converges to zero (see FIG. 3). Therefore, as shown in FIG. 9, gate electric charge quantity Qg in the short-circuited state rises and converges to a constant value after time t0. A convergence value is lower than that in the normal state.

As shown in FIG. 9, a difference in waveform also appears in the differential signal of gate voltage Vg and gate electric charge quantity Qg, based on the presence or absence of the Miller period. Therefore, short circuit determination circuit 32 can determine that semiconductor element 1 is in the short-circuited state, by detecting a difference in waveform of the detected physical quantity from the waveform in the normal state.

When noise is applied to gate electrode 1g during the Miller period, oscillations occur in gate voltage Vg and gate current Ig during the Miller period (see FIG. 4). Since oscillations also occur in the differential signal of gate voltage Vg and gate electric charge quantity Qg during the Miller period, these oscillations may cause short circuit determination circuit 32 to wrongly determine that semiconductor element 1 is in the short-circuited state. However, as described above, wrong determination signal Sj output from short circuit determination circuit 32 is delayed or cut off by filter 4. Therefore, it is possible to prevent a malfunction of controller 2 based on wrong determination signal Sj.

Figure 10:
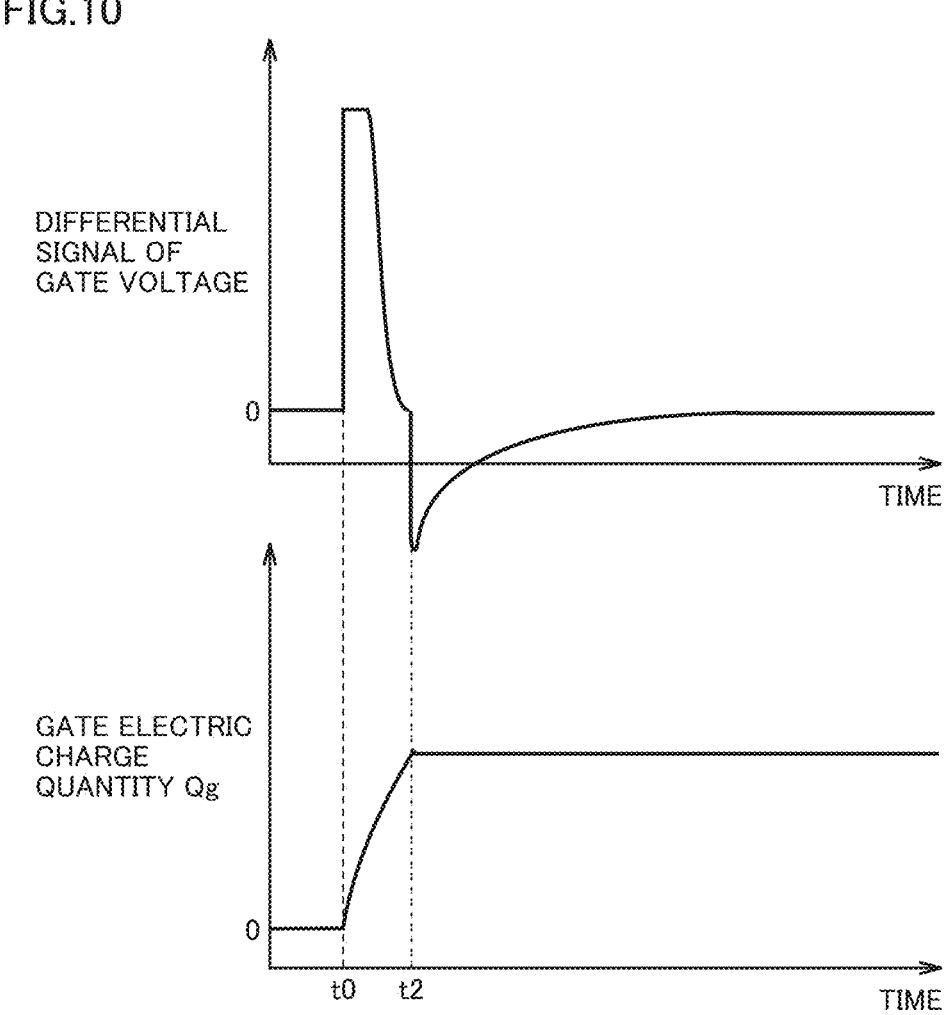
FIG. 10 shows waveform diagrams schematically showing time variation in differential signal of the gate voltage and gate electric charge when the turn-off operation is started during the turn-on operation of the power semiconductor element.

FIG. 10 shows waveform diagrams schematically showing time variation in differential signal of gate voltage Vg and gate electric charge quantity Qg when the turn-off operation is started during the turn-on operation of semiconductor element 1. When the turn-off operation is started at time t2 during the Miller period, gate voltage Vg and gate current Ig during the Miller period decreases abruptly (see FIG. 5). Therefore, as shown in FIG. 10, an abrupt decrease also appears in the waveform of the differential signal of gate voltage Vg during the Miller period. In contrast, gate electric charge quantity Qg stops rising at time t2, and then, is maintained at a constant value.

Due to the abrupt change in differential signal and gate electric charge quantity Qg, short circuit determination circuit 32 may wrongly determine that semiconductor element 1 is in the short-circuited state. However, as described above, wrong determination signal Sj output from short circuit determination circuit 32 is delayed or cut off by filter 4. Therefore, it is possible to prevent a malfunction of controller 2 based on wrong determination signal Sj.

Fifth Embodiment

In a fifth embodiment, description will be given of a second configuration example of short circuit determination unit 3 applied to drive circuit 100 according to the first embodiment (see FIGS. 1 and 2).

Figure 11:
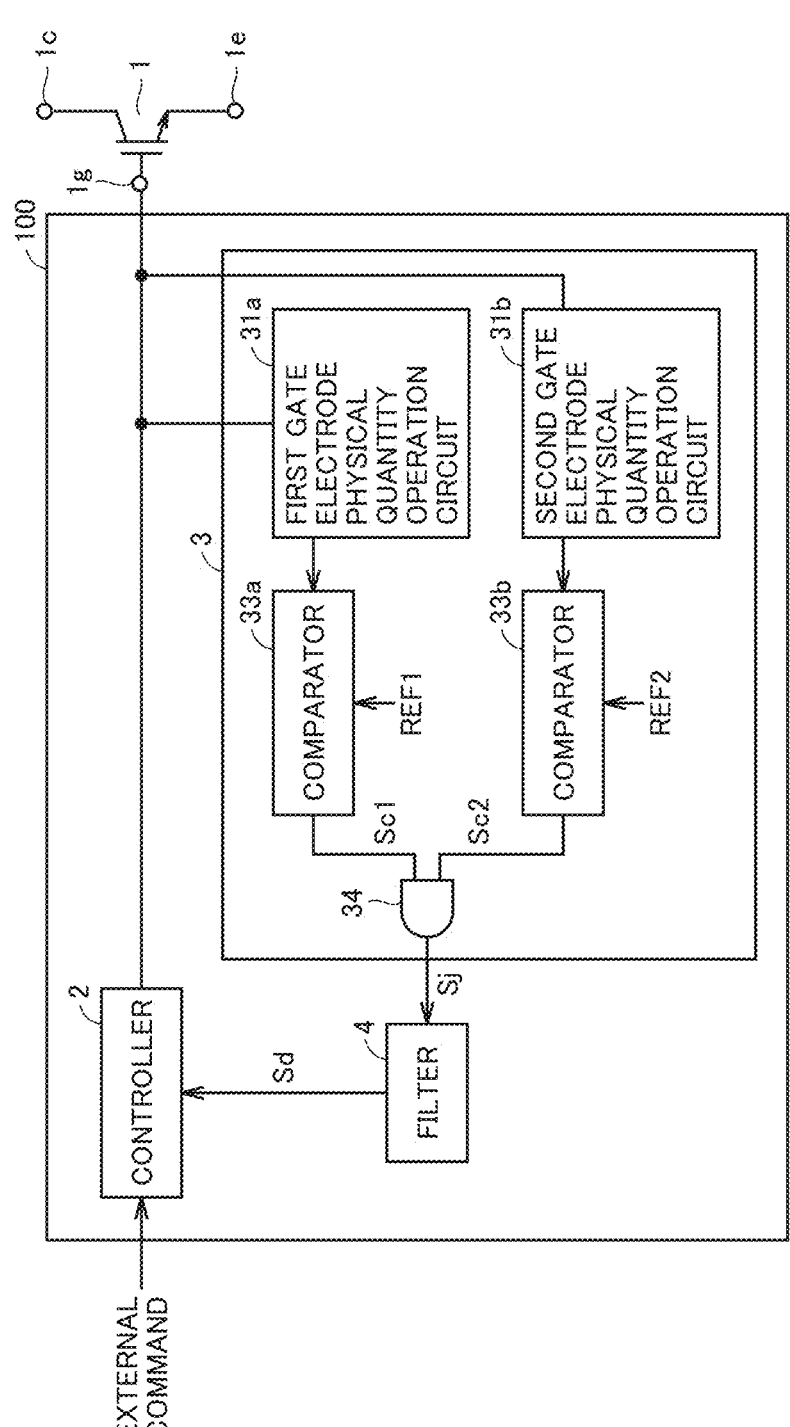
FIG. 11 shows a second configuration example of the short circuit determination unit.

FIG. 11 shows the second configuration example of short circuit determination unit 3.

As shown in FIG. 11, short circuit determination unit 3 according to the second configuration example includes a first gate electrode physical quantity operation circuit 31a (hereinafter, simply referred to as "first operation circuit 31a"), a second gate electrode physical quantity operation circuit 31b (hereinafter, simply referred to as "second operation circuit 31b"), a first comparator 33a, a second comparator 33b, and an AND circuit 34.

First operation circuit 31a is connected to gate electrode 1g of semiconductor element 1 and obtains a first physical quantity at gate electrode 1g. The first physical quantity obtained by first operation circuit 31a is, for example, any one of gate voltage Vg, gate current Ig, the differential signal of gate voltage Vg, and gate electric charge quantity Qg.

First comparator 33a compares the first physical quantity obtained by first operation circuit 31a with a first reference value REF1, and outputs a signal Sc1 indicating a comparison result. For example, in the case where the first physical quantity is the differential signal of gate voltage Vg, first comparator 33a outputs signal Sc1 having the H level when the first physical quantity is higher than first reference value REF1, and outputs signal Sc1 having the L level when the first physical quantity is equal to or lower than first reference value REF1.

Second operation circuit 31b is connected to gate electrode 1g of semiconductor element 1 and obtains a second physical quantity at gate electrode 1g. The second physical quantity obtained by second operation circuit 31b is different from the first physical quantity, and is, for example, any one of gate voltage Vg, gate current 1g, the differential signal of gate voltage Vg, and gate electric charge quantity Qg.

Second comparator 33b compares the second physical quantity obtained by second operation circuit 31b with a second reference value REF2, and outputs a signal Sc2 indicating a comparison result. For example, in the case where the second physical quantity is gate electric charge quantity Qg, second comparator 33b outputs signal Sc2 having the H level when the second physical quantity is lower than second reference value REF2, and outputs signal Sc2 having the L level when the second physical quantity is equal to or higher than second reference value REF2.

AND circuit 34 performs an AND operation between output signal Sc1 of first comparator 33a and output signal Sc2 of second comparator 33b, to thereby generate determination signal Sj. When output signal Sc1 of first comparator 33a and output signal Sc2 of second comparator 33b both have the H level, AND circuit 34 determines that semiconductor element 1 is in the short-circuited state, and outputs determination signal Sj having the H level. Otherwise, AND circuit 34 outputs determination signal Sj having the L level. In the present configuration example, when the differential signal of gate voltage Vg is higher than first reference value REF1 and gate electric charge quantity Qg is lower than second reference value REF2, AND circuit 34 determines that semiconductor element 1 is in the short-circuited state, and outputs determination signal Sj having the H level. AND circuit 34 may be formed of a combination of NAND circuits.

As described above, when both the first and second physical quantities satisfy the predetermined condition (when signals Sc1 and Sc2 both have the H level), short circuit determination unit 3 according to the second configuration example determines that semiconductor element 1 is in the short-circuited state. That is, short circuit determination unit 3 may be configured to determine the short-circuited state of semiconductor element 1 based on a correlation between the first and second physical quantities.

Short circuit determination unit 3 according to the second configuration example may also output wrong determination signal Sj when the above-described correlation between the two physical quantities changes abruptly due to the application of noise during the Miller period in the turn-on operation or the start of the turn-off operation. Since this wrong determination signal Sj is attenuated or cut off by filter 4 in the subsequent stage, input of wrong determination signal Sj to controller 2 is blocked. Thus, it is possible to prevent such a malfunction that controller 2 controls semiconductor element 1 to the off state based on wrong determination signal Sj.

Sixth Embodiment

In a sixth embodiment, the semiconductor device according to the first embodiment is applied to a power conversion device. The following is a description of the case in which the present disclosure is applied to a three-phase inverter.

Figure 12:
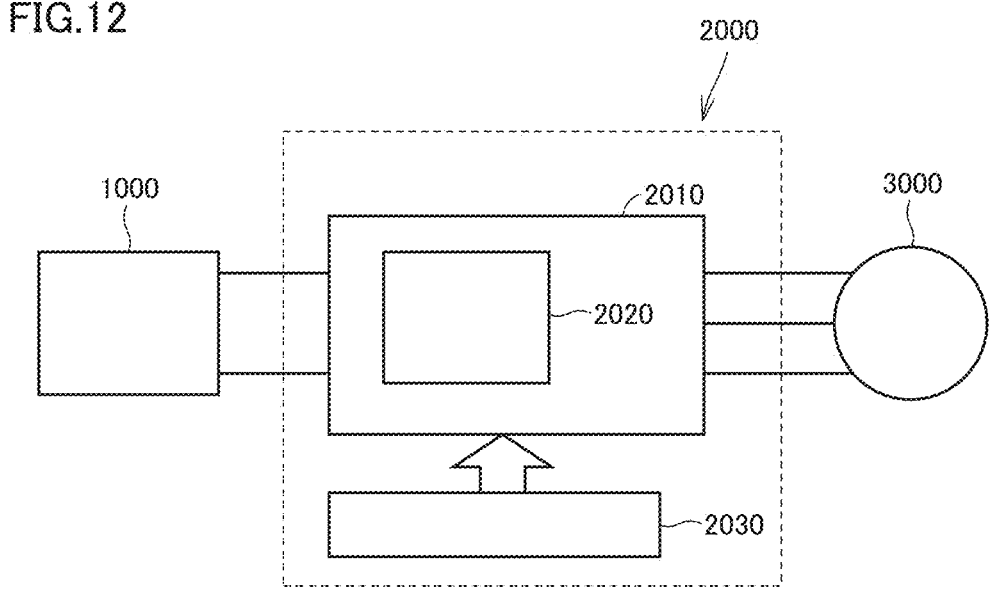
FIG. 12 is a block diagram showing a configuration of a power conversion system in which a power conversion device according to a six embodiment is applied.

FIG. 12 is a block diagram showing a configuration of a power conversion system to which the power conversion device according to the sixth embodiment is applied.

As shown in FIG. 12, the power conversion system includes a power supply 1000, a power conversion device 2000 and a load 3000. Power supply 1000 is a DC power supply and supplies DC power to power conversion device 2000. Power supply 1000 can be implemented by various components, e.g., a DC system, a photovoltaic cell and a storage battery. Alternatively, power supply 1000 may be implemented by a rectifier circuit or an AC/DC converter connected to an AC system. Alternatively, power supply 1000 may be implemented by a DC/DC converter that converts current power supplied from the DC system into electric power made available to load 3000.

Power conversion device 2000 is a three-phase inverter connected between power supply 1000 and load 3000, and converts DC power supplied from power supply 1000 into three-phase AC power and supplies the three-phase AC power to load 3000. As shown in FIG. 12, power conversion device 2000 includes a main conversion circuit 2010 that converts DC power into AC power, and a control circuit 2030 that outputs, to main conversion circuit 2010, a control signal for controlling main conversion circuit 2010.

Load 3000 is a three-phase motor driven by the AC power supplied from power conversion device 2000, and is used, for example, as a motor for a hybrid vehicle, an electric vehicle, a rolling stock, an elevator, or an air conditioner.

Details of power conversion device 2000 will be described below. Main conversion circuit 2010 includes a switching element (not shown), and switching of the switching element causes main conversion circuit 2010 to convert the DC power supplied from power supply 1000 into AC power and supply the AC power to load 3000. Although there are various specific circuit configurations of main conversion circuit 2010, main conversion circuit 2010 according to the present embodiment is a two-level three-phase full-bridge circuit and can be formed of six switching elements and six freewheeling diodes connected in antiparallel to the switching elements, respectively. Main conversion circuit 2010 includes a semiconductor device 2020 including each switching element and a drive circuit that drives each switching element. Each switching element and each drive circuit included in semiconductor device 2020 correspond to semiconductor element 1 and drive circuit 100 of the semiconductor device according to the first embodiment described above. The six switching elements are connected in series in pairs to form upper and lower arms, and each pair of the upper and lower arms forms each phase (U phase, V phase and W phase) of the full-bridge circuit. Output terminals of each pair of the upper and lower arms, i.e., three output terminals of main conversion circuit 2010 are connected to load 3000.

Control circuit 2030 controls the switching elements of main conversion circuit 2010 such that desired electric power is supplied to load 3000. Specifically, based on the electric power to be supplied to load 3000, the time (on time) at which each switching element of main conversion circuit 2010 should be turned on is calculated. For example, main conversion circuit 2010 can be controlled by PWM control in which the on time of each switching element is modulated in accordance with a voltage to be output. A control command (control signal) is output to the drive circuit of main conversion circuit 2010 such that an on signal is output to a switching element that should be turned on and an off signal is output to a switching element that should be turned off at each point in time. In accordance with this control signal, the drive circuit outputs the on signal or the off signal to the gate electrode of each switching element as a drive signal.

In the power conversion device according to the sixth embodiment, the semiconductor device according to the first embodiment is applied as semiconductor device 2020 that forms main conversion circuit 2010. Therefore, the short-circuited state of the semiconductor element can be detected with a simple circuit, similarly to the first embodiment.

Although the example in which the present disclosure is applied to the two-level three-phase inverter has been described in the sixth embodiment, the present disclosure is not limited thereto and is applicable to various power conversion devices. Although the present disclosure is applied to the two-level power conversion device in the sixth embodiment, the present disclosure may be applied to a three-level or multi-level power conversion device, or may be applied to a single-phase inverter when electric power is supplied to a single-phase load. The present disclosure is also applicable to a DC/DC converter or an AC/DC converter when electric power is supplied to a DC load or the like.

In addition, the power conversion device to which the present disclosure is applied is not limited to the above-described case in which the load is a motor, and can also be used, for example, as a power supply device for an electric discharge machining apparatus, a laser processing machine, an induction heating cooker, or a wireless power transfer system. Furthermore, the power conversion device to which the present disclosure is applied can also be used as a power conditioner for a photovoltaic power generation system, a power storage system or the like.

It should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

REFERENCE SIGNS LIST

1 power semiconductor element; 1c collector electrode; 1e emitter electrode; 1g gate electrode; 2 controller; 3 short circuit determination unit; 4 filter, 5 buffer circuit; 6a on gate resistor; 6b off gate resistor, 7 optocoupler; 8 MOSFET; 11, 12, 14 ground; 13, 15 power supply node; 31 gate electrode physical quantity operation circuit; 31a first gate electrode physical quantity operation circuit; 31b second gate electrode physical quantity operation circuit; 32 short circuit determination circuit; 33a first comparator, 33b second comparator, 34 AND circuit; 41 input terminal; 42 output terminal; 100 drive circuit; 1000 power supply; 2000 power conversion device; 2010 main conversion circuit; 2020 semiconductor device; 2030 control circuit; 3000 load; R1 to R6 resistor, C1 to C4 capacitor.

The invention claimed is:

1. A drive circuit for a power semiconductor element that drives a power semiconductor element including a gate electrode, a first main electrode and a second main electrode, the drive circuit comprising:

a controller to control an opened/closed state of the power semiconductor element based on an externally received command;

a short circuit determination circuitry to determine whether the power semiconductor element is in a short-circuited state in a turn-on operation of the power semiconductor element, and output a determination signal indicating a determination result; and a filter to receive the determination signal from the short circuit determination circuitry, generate a delay signal of the determination signal, and output the delay signal to the controller, wherein a delay time of the filter is set to be longer than a length of a Miller period in the turn-on operation of the power semiconductor element, and the delay time is related to a value involving a parasitic capacitance between the gate electrode and the first main electrode, and a difference between an on gate voltage applied from the controller to the gate electrode and a Miller voltage of the power semiconductor element.

2. The drive circuit for the power semiconductor element according to claim 1, further comprising an on gate resistor connected between the controller and the gate electrode, wherein the delay time satisfies a relational equation including the value given by an equation (1) below:

$$\tau > \frac{Qgc \times \text{Rg\_on}}{\text{Vg\_on} - Vm}, \tag{1}$$

where τ represents the delay time of the filter, Vg_on represents the on gate voltage applied from the controller to the gate electrode, Vm represents the Miller voltage of the power semiconductor element, Qgc represents an electric charge quantity stored in the parasitic capacitance between the gate electrode and the first main electrode, and Rg_on represents a resistance value of the on gate resistor.

3. The drive circuit for the power semiconductor element according to claim 1, wherein the filter includes an RC circuit including a resistor and a capacitor, and the delay time is set by using a time constant of the RC circuit.

4. The drive circuit for the power semiconductor element according to claim 3, wherein the filter further includes:

an input terminal to receive the determination signal;

an output terminal to output the delay signal; and an optocoupler connected between the input terminal and the output terminal, and the resistor and the capacitor are connected at least one of between the input terminal and the optocoupler and between the optocoupler and the output terminal.

5. The drive circuit for the power semiconductor element according to claim 1, wherein the short circuit determination circuitry is connected to the gate electrode, and determines whether the power semiconductor element is in the short-circuited state, based on at least one physical quantity obtained at the gate electrode in the turn-on operation.

6. The drive circuit for the power semiconductor element according to claim 5, wherein the at least one physical quantity includes a first physical quantity and a second physical quantity, and the short circuit determination circuitry determines whether the power semiconductor element is in the short-circuited state, based on a correlation between the first physical quantity and the second physical quantity.

7. The drive circuit for the power semiconductor element according to claim 1, wherein the power semiconductor element is an element made of any one of silicon, silicon carbide, gallium nitride, and gallium oxide.

8. A semiconductor device comprising the drive circuit and the power semiconductor element as recited in claim 1.

9. A power conversion device comprising:

a main conversion circuit including the drive circuit and the power semiconductor element as recited in claim 1, to convert input electric power and output the electric power; and a control circuit to output, to the main conversion circuit, a control signal for controlling the main conversion circuit.

10. A drive circuit for a power semiconductor element that drives a power semiconductor element including a gate electrode, a first main electrode and a second main electrode, the drive circuit comprising:

a controller to control an opened/closed state of the power semiconductor element based on an externally received command;

a short circuit determination circuitry to determine whether the power semiconductor element is in a short-circuited state in a turn-on operation of the power semiconductor element, and output a determination signal indicating a determination result;

a filter to receive the determination signal from the short circuit determination circuitry, generate a delay signal of the determination signal, and output the delay signal to the controller; and an on gate resistor connected between the controller and the gate electrode, wherein a delay time of the filter is set to be longer than a length of a Miller period in the turn-on operation of the power semiconductor element, and the delay time satisfies a relational equation given by an equation (1) below:

$$\tau > \frac{Qgc \times \mathrm{Rg\_on}}{\mathrm{Vg\_on} - Vm}, \tag{1}$$

where τ represents the delay time of the filter, Vg_on represents an on gate voltage applied from the controller to the gate electrode, Vm represents a Miller voltage of the power semiconductor element, Qgc represents an electric charge quantity stored in a parasitic capacitance between the gate electrode and the first main electrode, and Rg_on represents a resistance value of the on gate resistor.

11. The drive circuit for the power semiconductor element according to claim 10, wherein the filter includes an RC circuit including a resistor and a capacitor, and the delay time is set by using a time constant of the RC circuit.

12. The drive circuit for the power semiconductor element according to claim 11, wherein the filter further includes:

an input terminal to receive the determination signal;

an output terminal to output the delay signal; and an optocoupler connected between the input terminal and the output terminal, and the resistor and the capacitor are connected at least one of between the input terminal and the optocoupler and between the optocoupler and the output terminal.

13. The drive circuit for the power semiconductor element according to claim 10, wherein the short circuit determination circuitry is connected to the gate electrode, and determines whether the power semiconductor element is in the short-circuited state, based on at least one physical quantity obtained at the gate electrode in the turn-on operation.

14. The drive circuit for the power semiconductor element according to claim 13, wherein the at least one physical quantity includes a first physical quantity and a second physical quantity, and the short circuit determination circuitry determines whether the power semiconductor element is in the short-circuited state, based on a correlation between the first physical quantity and the second physical quantity.

15. The drive circuit for the power semiconductor element according to claim 10, wherein the power semiconductor element is an element made of any one of silicon, silicon carbide, gallium nitride, and gallium oxide.

16. A semiconductor device comprising the drive circuit and the power semiconductor element as recited in claim 10.

17. A power conversion device comprising:

a main conversion circuit including the drive circuit and the power semiconductor element as recited in claim 10, to convert input electric power and output the electric power; and a control circuit to output, to the main conversion circuit, a control signal for controlling the main conversion circuit.

18. A drive circuit for a power semiconductor element that drives a power semiconductor element including a gate electrode, a first main electrode and a second main electrode, the drive circuit comprising:

a controller to control an opened/closed state of the power semiconductor element based on an externally received command;

a short circuit determination circuitry to determine whether the power semiconductor element is in a short-circuited state in a turn-on operation of the power semiconductor element, and output a determination signal indicating a determination result; and a filter to receive the determination signal from the short circuit determination circuitry, generate a delay signal of the determination signal, and output the delay signal to the controller, wherein the filter includes:

an RC circuit including a resistor and a capacitor, an input terminal to receive the determination signal, an output terminal to output the delay signal, and an optocoupler connected between the input terminal and the output terminal, a delay time of the filter is set to be longer than a length of a Miller period in the turn-on operation of the power semiconductor element, the delay time is set by using a time constant of the RC circuit, the resistor and the capacitor are connected at least one of between the input terminal and the optocoupler and between the optocoupler and the output terminal, and the optocoupler electrically insulates the input terminal from the output terminal.

19. The drive circuit for the power semiconductor element according to claim 18, wherein the input terminal receives the determination signal from the short circuit determination circuitry, and the output terminal outputs the delay signal to the controller, thereby electrically insulating the short circuit determination circuitry from the controller.

20. The drive circuit for the power semiconductor element according to claim 18, wherein the filter further includes a comparator to compare the delay signal with a predetermined reference value and output a shaped delay signal.

* * * * *